United States Patent
Lilly et al.

(10) Patent No.: US 9,697,827 B1
(45) Date of Patent: Jul. 4, 2017

(54) ERROR REDUCTION IN SPEECH PROCESSING

(71) Applicant: Amazon Technologies, Inc., Reno, NV (US)

(72) Inventors: Jeffrey Paul Lilly, Seattle, WA (US); Ryan Paul Thomas, Redmond, WA (US); Jeffrey Penrod Adams, Tyngsborough, MA (US)

(73) Assignee: Amazon Technologies, Inc., Seattle, WA (US)

( * ) Notice: Subject to any disclaimer, the term of this patent is extended or adjusted under 35 U.S.C. 154(b) by 504 days.

(21) Appl. No.: 13/711,478

(22) Filed: Dec. 11, 2012

(51) Int. Cl.
*G10L 15/18* (2013.01)
*G06F 17/20* (2006.01)
*G10L 15/00* (2013.01)
*G10L 15/04* (2013.01)
*G10L 15/14* (2006.01)

(52) U.S. Cl.
CPC .................... *G10L 15/18* (2013.01)

(58) Field of Classification Search
None
See application file for complete search history.

(56) References Cited

U.S. PATENT DOCUMENTS

| | | | | |
|---|---|---|---|---|
| 5,444,617 A | * | 8/1995 | Merialdo | G06F 17/274 704/238 |
| 5,477,451 A | * | 12/1995 | Brown | G06F 17/2755 704/2 |
| 5,729,656 A | * | 3/1998 | Nahamoo | G10L 15/04 704/254 |
| 6,073,098 A | * | 6/2000 | Buchsbaum | G10L 15/08 704/242 |
| 7,027,988 B1 | * | 4/2006 | Mohri | G06F 17/2775 704/10 |
| 7,127,394 B2 | * | 10/2006 | Strong | G10L 15/1822 704/255 |
| 7,260,187 B1 | * | 8/2007 | McAllister | H04M 3/493 379/88.03 |
| 7,698,136 B1 | * | 4/2010 | Nguyen | G10L 15/08 704/231 |

(Continued)

OTHER PUBLICATIONS

Mishra, Taniya et al., "Finite-state models for Speech-based Search on Mobile Devices," *Natural Language Engineering* 1 (1), 1998 Cambridge University, United Kingdom.

(Continued)

*Primary Examiner* — Richemond Dorvil
*Assistant Examiner* — Thuykhanh Le
(74) *Attorney, Agent, or Firm* — Knobbe, Martens, Olson & Bear, LLP (57) ABSTRACT

Features are disclosed for reducing errors in speech recognition processing. Methods for reducing errors can include receiving multiple speech recognition hypotheses based on an utterance indicative of a command or query of a user and determining a command or query within a grammar having a least amount of difference from one of the speech recognition hypotheses. The determination of the least amount of difference may be based at least in part on a comparison of individual subword units along at least some of the sequence paths of the speech recognition hypotheses and the grammar. For example, the comparison may be performed on the phoneme level instead of the word level.

30 Claims, 7 Drawing Sheets

(56) References Cited

U.S. PATENT DOCUMENTS

| | | | | |
|---|---|---|---|---|
| 8,077,984 B2* | 12/2011 | Cancedda | G06K 9/627 | 382/290 |
| 8,290,774 B1* | 10/2012 | Mohri | G06F 17/2775 | 704/257 |
| 8,543,398 B1* | 9/2013 | Strope | G10L 15/063 | 704/235 |
| 8,589,164 B1* | 11/2013 | Mengibar | G10L 15/06 | 704/10 |
| 8,972,243 B1* | 3/2015 | Strom | G10L 15/1815 | 704/1 |
| 9,070,367 B1* | 6/2015 | Hoffmeister | G10L 15/187 | |
| 2002/0059168 A1* | 5/2002 | Komai | G06Q 10/109 | |
| 2003/0004721 A1* | 1/2003 | Zhou | G10L 15/083 | 704/251 |
| 2003/0144837 A1* | 7/2003 | Basson | G10L 15/32 | 704/231 |
| 2003/0208289 A1* | 11/2003 | Ben-Arie | G06F 3/011 | 700/61 |
| 2004/0230420 A1* | 11/2004 | Kadambe | G10L 15/07 | 704/205 |
| 2005/0119885 A1* | 6/2005 | Axelrod | G10L 15/063 | 704/231 |
| 2005/0143970 A1* | 6/2005 | Roth | G10L 15/063 | 704/4 |
| 2007/0288183 A1* | 12/2007 | Bulkes | A61B 5/04012 | 702/66 |
| 2008/0114595 A1* | 5/2008 | Vair | G10L 15/08 | 704/236 |
| 2008/0208854 A1* | 8/2008 | Badr | G06F 17/30985 | |
| 2009/0182559 A1* | 7/2009 | Gerl | G10L 15/08 | 704/235 |
| 2010/0217596 A1* | 8/2010 | Morris | G10L 15/10 | 704/251 |
| 2010/0293195 A1* | 11/2010 | Houghton | G06F 17/241 | 707/776 |
| 2011/0131046 A1* | 6/2011 | Zweig | G10L 15/02 | 704/251 |
| 2011/0166851 A1* | 7/2011 | LeBeau | G06F 17/273 | 704/9 |
| 2012/0046935 A1* | 2/2012 | Nagao | G06F 17/2775 | 704/8 |
| 2012/0271639 A1* | 10/2012 | Hanson | G10L 15/06 | 704/275 |
| 2013/0007035 A1* | 1/2013 | Ajmera | G06F 17/30755 | 707/769 |
| 2013/0080161 A1* | 3/2013 | Iwata | G10L 15/24 | 704/231 |
| 2014/0136210 A1* | 5/2014 | Johnston | G10L 15/07 | 704/275 |
| 2014/0229177 A1* | 8/2014 | Kanthak | G10L 15/08 | 704/236 |
| 2014/0372119 A1* | 12/2014 | Parada | G06F 17/30899 | 704/246 |

OTHER PUBLICATIONS

Sagae, K. et al., "Hallucinated N-Best Lists for Discriminative Language Modeling," 2012 IEEE International Conference on Acoustics, Speech and Signal Processing (ICASSP), Mar. 25-30, 2012, pp. 5001-5004 (paper based on work done as part of a 2011 CLSP summer workshop at Johns Hopkins University).

* cited by examiner

ERROR REDUCTION IN SPEECH PROCESSING

BACKGROUND

Modern speech recognition systems typically include both speech layer and understanding layer processing to analyze spoken commands or queries provided by a user. Speech layer processing is used to identify words or word sequences possibly spoken by the user. The output of the speech layer processing typically includes multiple alternative word sequences that may have been spoken. Understanding layer processing is used to determine which of the multiple alternative word sequences was most likely spoken. The understanding layer processing may also be used to initiate an action or response based upon the determination of the word sequence most likely spoken. However, errors in the speech layer processing inevitably lead to errors in the understanding layer processing. Such errors can result in incorrect actions being performed or incorrect responses being given in response to user commands or queries.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Introduction

The present disclosure generally relates to systems and methods for reducing errors in an understanding layer of a speech recognition environment. For example, aspects of the present disclosure relate to a natural language understanding unit that determines likely commands or queries corresponding to speech output (e.g., words in the form of a lattice or N-best list) from an automatic speech recognition device. The determination of the commands is based at least in part on an analysis of a user's utterance at a subword unit level instead of solely at the word level. Such processing provides improved accuracy in language understanding by reducing errors that may occur based on word comparisons alone.

Automatic speech recognition may be used with many different applications, including media applications (such as playing or purchasing music or videos), network browser searching applications, messaging applications, email applications, calendar applications, reminder or note applications, weather applications and/or time applications, among others. For example, user devices (such as mobile communication devices, tablets, laptops, personal computers, etc.) may be configured to execute applications using a natural language user interface. Such an interface allows the user to speak a command or query that is processed by a speech recognition system to control the user device. The speech recognition system may be configured to initiate an action or provide a response to the user based on the speech recognition processing.

Errors in speech recognition processing may lead to incorrect actions or responses being performed by the user's device. This can frustrate the user and cause the user to provide voice-control commands multiple times, until the user device performs the correct, desired action or response. Embodiments of the present disclosure advantageously reduce the impact of errors propagated from a speech layer by improving performance of an understanding layer. In some implementations, a grammar corresponding to a natural language understanding unit uses knowledge of expected speech layer outputs to reduce speech processing errors.

In one embodiment, comparing the output of the speech layer with an understanding layer's grammar at the subword unit level may result in fewer errors. For example, when a user utters the word "play," an automatic speech recognition unit may "hear" the word "prayer." The word "prayer" may not be included in the grammar as a possible alternative or "mis-hearing" of the word "play" because the two words are different from each other. In such situations, a device performing automatic speech recognition would fail to understand the user's spoken command or query. However, if the word "play" is first converted to phonemes and compared to phonemes corresponding to the word "prayer," then the similar phonemes between the two words can be identified and lead to a higher probability of matching "prayer" to "play" and understanding the user's utterance.

A grammar may include a set of predefined possible commands or queries that may be performed by one or more applications. In some embodiments, the grammar is implemented as a finite state transducer ("FST," sometimes referred to as a finite state automaton or finite state machine) having subword units (such as phonemes) on at least some of the arcs between the FST's states. The grammar may be stored as an FST of subword units, an FST of words that may be converted to individual subword units "on the fly" or in real time as necessary (e.g., by consulting a lexicon), or a combination of words and subword units. Although described herein with reference to commands or queries, the term "command" can include commands, queries, sentences, phrases, one or more words or any other utterance. For example, as used herein, a "command" may include a question or any other utterance a user may speak to a device.

A set of recognition hypotheses (e.g., possible or candidate sentences or word sequences that may have been uttered based on an audio recording) from the automatic speech recognition unit may also be represented as an FST.

Such FSTs (or in some embodiments, a graph, an acceptor, a transducer, etc.) include words (and/or phonemes or other subword units) on the arcs between at least some of the FST's states. In some embodiments, the FST of the recognition hypotheses and the FST of the grammar may be composed (e.g., by performing a composition operation) and used to determine one or more difference scores (e.g., cost functions, distance scores) between pairs of paths of the two FSTs. For example, each possible path within one FST is compared to each possible path within a second FST, and a difference score is determined based upon the differences between the two paths. One or more path pairs of the first and second FST with a lowest difference score may be identified. The path(s) with the lowest difference score(s) may advantageously be computed by converting at least some of the words of an FST of speech recognition hypotheses and a grammar FST into subword units (for example, phonemes, triphones, diphones, syllables, parts of syllables, or whole word models). Calculating difference scores at the subword unit level can improve the cost calculation accuracy and improve natural language understanding accuracy.

In accordance with some embodiments, if multiple paths are generated during the determination of the command or query corresponding to the speech output from the automatic speech recognition unit, a final path may be selected based on one or more additional criteria (such as historical user data or preferences, availability of hardware or files, etc.). Once a final path is selected, an action may be initiated in response to the final path determination. The selected path may include information about the action.

In some implementations, a confusion table (e.g., matrix, list, array, or graph) is used to determine penalties associated with insertion of a phoneme, deletion of a phoneme, or substitution of one phoneme with another phoneme. In implementations where the path comparison is performed on a phoneme level, the difference scores of the various paths may be affected by applying penalties for insertions, deletions and substitutions based on phonetic similarity. For example, a substitution of "p" with "b" might be a smaller penalty than a substitution of "m" with "p" due to the greater degree of phonetic similarity between the "b" and "p" phonemes.

In one illustrative example, a plurality of speech recognition hypotheses based on an utterance is received by a natural language understanding unit. In some implementations, the speech recognition hypotheses are indicative of a command or query corresponding to a particular application, such as playing music, asking what the weather will be like tomorrow, or the current time. The speech recognition hypotheses may represent a sequence of words (and/or phonemes or other subword units) representative of possible utterances. A computing device may determine one or more commands or queries within a grammar that most closely match one or more of the speech recognition hypotheses. The computing device can determine the commands based at least in part on a comparison of individual subword units of the speech recognition hypotheses and the grammar.

In another illustrative example, an utterance is recorded and processed by a speech recognizer. The speech recognizer generates a recognition lattice of candidate hypotheses corresponding to the speech recording. The recognition lattice may be stored in an electronic data store. A lattice may be a directed acyclic graph where the segments (or arcs) are associated with recognized words (or subword units) in the hypotheses and the words are joined at nodes. Each segment may be associated with a probability that the word associated with the segment is a correct word (e.g., that the speech recognizer correctly recognized an uttered word as the word associated with the segment). Each path through the lattice may correspond to a recognition hypothesis. The lattice may provide a more compact representation than other data structures since common words in the recognition hypotheses may be represented by a single segment. For example, if all of the recognition hypotheses started with the word "the," then the lattice could begin with a single segment for the word "the" and then segments for subsequent words in the hypotheses would follow the initial segment. Examples of such lattices are described in greater detail below.

A lattice processor in communication with the electronic data store may be configured to generate an FST. The FST can include input words that are based at least in part on the recognition lattice output by the speech recognizer. A second FST may be generated from a grammar. The grammar may include a predefined set of commands or queries that are each correlated with an action or response. The grammar FST may have been generated previously and stored on the electronic data store. In some implementations, the input FST and the grammar FST advantageously each include subword units for a more accurate comparison.

Next, a processing device may generate an output FST including one or more paths indicative of one or more paths in common and/or with the lowest difference scores between the input FST and the grammar FST. If the output FST includes multiple paths, a final output path may be selected based on one or more criteria. After a final output path is determined, the processing device may initiate an action or response corresponding to the final output path.

Further aspects of the present disclosure relate to the use of a confusion table in determining the penalties or costs of edits between subword units (e.g., phonemes). A confusion table may include probabilities that each subword unit of a language may be confused with other units of the language. A confusion table may also include probabilities that each subword unit may be incorrectly inserted into or deleted from a word of a recognized hypothesis from the speech recognition output when compared to a word of a possible command or query in the grammar. In some implementations, the probabilities are represented as penalties. In some embodiments, a confusion table is used in determining costs or penalties when composing two FSTs, as described above, and in greater detail below.

Although aspects of the embodiments described in the disclosure will focus, for the purpose of illustration, on a processing system for reducing errors in speech recognition applications, one skilled in the art will appreciate that the techniques disclosed herein may be applied to any number of software processes or applications. Further, although various aspects of the disclosure will be described with regard to illustrative examples and embodiments, one skilled in the art will appreciate that the disclosed embodiments and examples should not be construed as limiting.

For clarity in the following description, embodiments will be described using phonemes as the subword units. The embodiments, however, are not limited to using phonemes as the subword units, and any other subword units known to one of skill in the art may be used in place of phonemes. In addition, the embodiments will be described with reference to applications that involve commands or queries and speech processing systems that initiate action in response to determined commands or queries. However, the embodiments are not limited to the described command/query applications. Moreover, the embodiments will be described as using lattices, finite state machines, transducers or acceptors for the data structures. The embodiments, however, are not limited to using these particular data structures, and other data structures may be used.

Prior to describing embodiments of the implementations of the natural language understanding layer to reduce speech processing (e.g., language understanding) errors in greater detail, the overall speech recognition process will be described. A speech recording of an utterance may be processed by a speech recognizer to generate one or more recognition hypotheses, and each hypothesis may be associated with a recognition score that the hypothesis corresponds to the words of the user's recorded utterance. A recognition score may be any value that indicates a likelihood that a hypothesis corresponds to the spoken word. Examples of a recognition score include a cost, a penalty, a weight, a likelihood value and a probability. Because a speech recognizer may incorrectly recognize words, having more than one hypothesis may provide information about other possible correct words. The recognition hypotheses may be stored in various data structures, such as a top-N list, lattice, or directed graph. Each entry of a top-N list may be a recognition hypothesis and the list may be ordered such that the most probable hypothesis is at the top of the list. The recognition hypotheses can be alternate versions of phrases or sentences that may have been spoken by the user. A recognition score may be assigned to each word (or subword unit) of the phrases or sentences indicative of the likelihood that the word corresponds to the actual utterance.

The set of multiple recognition hypotheses is then passed on to a natural language understanding unit to determine the most likely of the multiple recognition hypotheses corresponding to a known command or query and to initiate an action or response by the speech processing system based on the determination. The determination of the most likely of the multiple recognition hypotheses corresponding to a known command or query may be performed by comparing the set of recognition hypotheses against a set of predefined recognized commands or queries and identifying the closest match between the two sets. The closest match may be determined by computing difference scores for one or more path pairs between the two sets, as will be described in more detail below. An action or response may then be initiated based on the command or query identified as the closest match.

A grammar may include a set of predefined recognized commands or queries. The grammar may potentially include thousands or millions of utterances that may be spoken by users of a speech recognition system or process. In some embodiments, the grammar represents a set of commands or queries that may be recognized by the natural language understanding system and corresponding to a particular action or response. The grammar may take advantage of using what the natural language understanding layer expects the user to say to compensate for errors in the speech recognition layer.

Speech Processing System for Error Reduction

Figure 1:
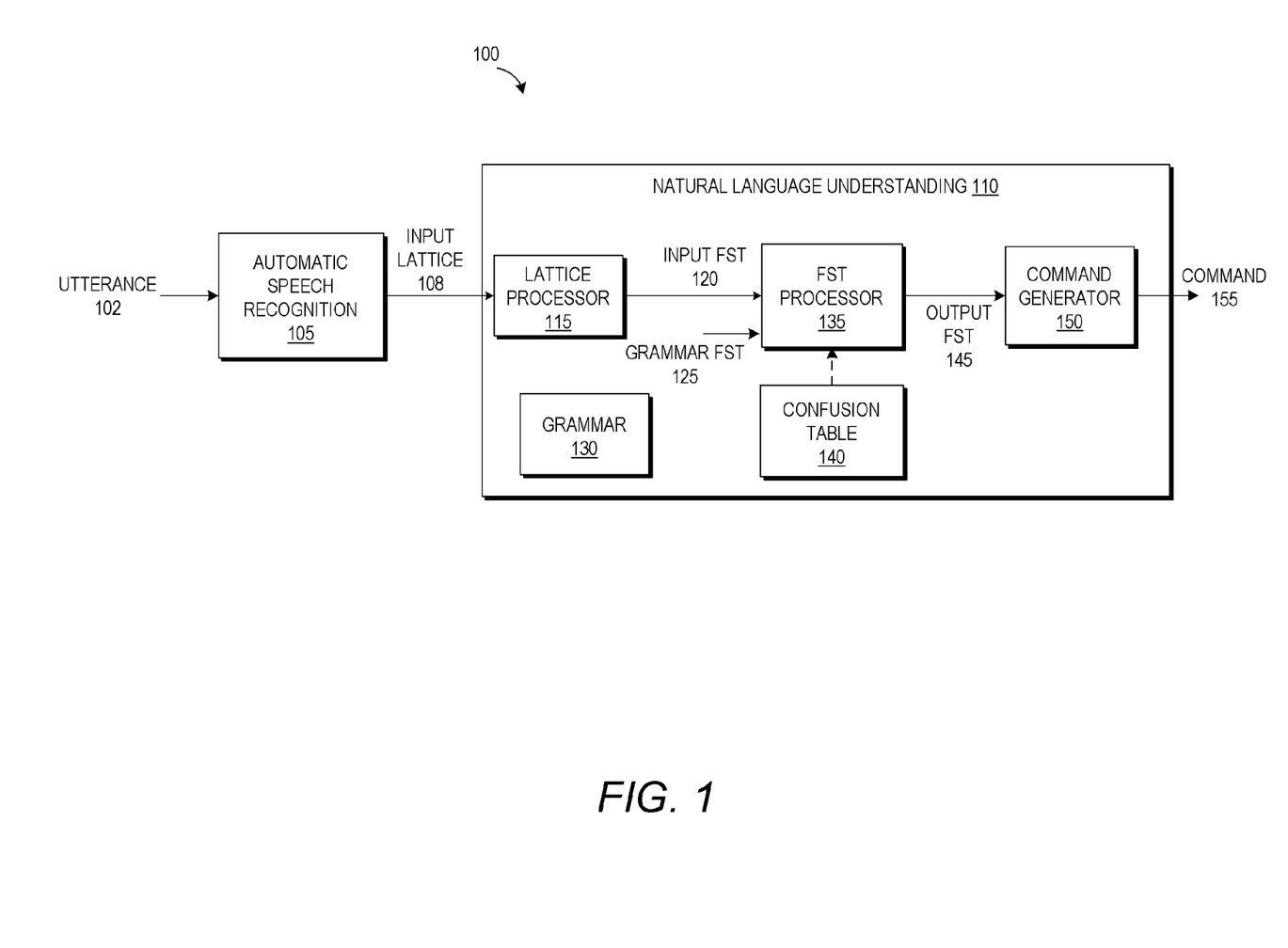
FIG. 1 is a block diagram of an embodiment of a speech processing system and illustrates components of a natural language understanding unit for reducing errors in the understanding of speech recognition output received from the automatic speech recognition unit.

FIG. 1 illustrates an embodiment of a speech processing system 100 that includes an automatic speech recognition unit 105 and a natural language understanding unit 110. The natural language understanding unit 110 is configured to reduce errors in the understanding of speech recognition output received from the automatic speech recognition unit 105. The speech processing system 100 will be described with reference to speech recognition applications involving commands or queries and with reference to particular data structures (e.g., lattices and finite state transducers). However, as discussed herein, the system 100 is not limited to such applications and data structures.

The speech processing system's automatic speech recognition unit 105 is configured to receive an utterance 102 from a user and to generate an input lattice 108 based on the received utterance 102. The natural language understanding unit 110 is configured to receive the input lattice 108 and determine a command 155 based upon the input lattice 108. In some embodiments, the system 100 is further configured to initiate an action (e.g., control a device, such as play music, turn on/off lights, provide directions to a location, etc.) based upon the command 155.

The utterance 102 may include a command or query, for example. The utterance 102 may comprise a sentence, question, or phrase of multiple words or may comprise a single word. Example utterances may include "Play a song by Elvis" or "Is it cold outside?", "What time is it?" or "Tell me about Abraham Lincoln." The utterance 102 may be converted to an audio signal and processed by the automatic speech recognition unit 105 to generate the input lattice 108. The input lattice 108 includes a set of multiple candidate hypotheses for the utterance 102. The input lattice 108 may be a lattice of words, subword units (e.g., phonemes), or a combination of words and subword units.

Figure 2A:
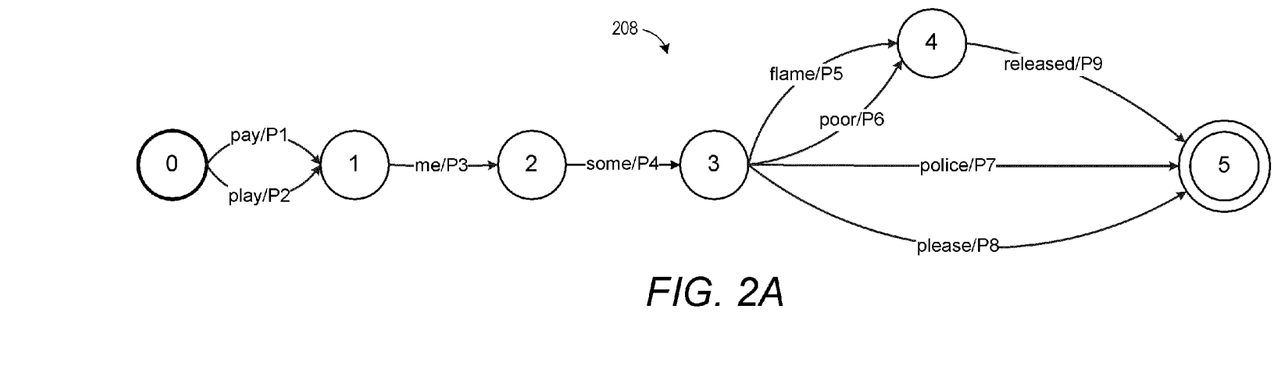
FIG. 2A is a diagram of an illustrative input lattice that may be processed by the natural language understanding unit of FIG. 1.

An example of an input lattice output from the automatic speech recognition unit 105 is shown in FIG. 2A. The input lattice 208 of FIG. 2A represents example candidate hypotheses for the utterance "Play me some Police." Referring to FIG. 2A, each arc of the lattice may optionally be assigned a recognition score (e.g., probability, cost, penalty, likelihood, etc.) indicative of a likelihood that the word or subword unit corresponding to the arc was actually included in the utterance 102. The recognition scores illustrated in FIG. 2A (represented as P1, P2, etc.) may represent probabilities that the utterance included the words shown. The recognition scores of the arcs leaving a node may sum up to 1; however, in some embodiments, the recognition scores of each node output do not sum to 1.

Referring back to FIG. 1, the natural language understanding unit 110 includes a lattice processor 115, a grammar 130, a finite state transducer processor 135, an optional confusion table 140 and a command generator 140. The lattice processor 115 is configured to receive the input lattice 108 and generate an input finite state transducer 120 from the input lattice 108. The input finite state transducer 120 may be a finite state transducer ("FST") or a finite state acceptor ("FSA"). An FSA is a finite state machine or automaton with no outputs. In some implementations, the input FST 120 is weighted. The input FST corresponding to the input lattice 208 shown in FIG. 2A could be an FSA having the same general structure as shown in FIG. 2A except that the labels would include identical output labels (for example, play:play/P2 for the second arc between state 0 and state 1).

The grammar 130 may represent a command or utterance grammar that includes a set of predefined possible commands or queries that may be performed by one or more applications. The grammar 130 may be converted to a grammar FST 125 and stored in an electronic data store or in memory on or in communication with the natural language understanding unit 110. The grammar FST 125 may be implemented as a finite state automaton, such as an FSA with no outputs.

Figure 2B:
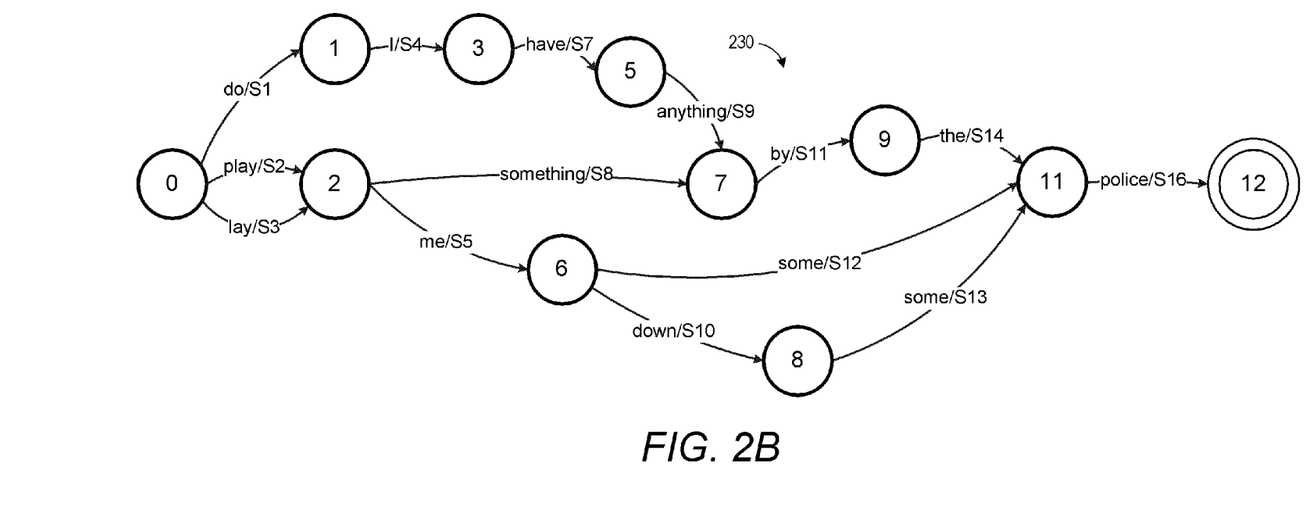
FIG. 2B is a diagram of an illustrative grammar of the natural language understanding unit of FIG. 1.

FIG. 2B illustrates an example of a portion of a grammar 230 corresponding to possible commands or queries that may be associated with the input lattice 208 of FIG. 2A. As shown, each arc between successive states may include a grammar score (represented as S1, S2, etc.). The grammar score may be indicative of a probability, a cost, a penalty, a likelihood, or an arbitrary value associated with traveling the arc. The grammar FST generated from the grammar 230 could be an FSA having the same general structure as shown in FIG. 2B except that the labels would include identical output labels.

Referring again to FIG. 1, the FST processor 135 is configured to receive two input FSTs and generate an output FST indicative of one or more paths of the grammar FST more or most likely to correspond to the user's utterance 102. As shown, the FST processor 135 is configured to receive the input FST 120 and the grammar FST 125 and to generate an output FST 145. The output FST 145 may comprise the one or more "best" or most likely paths through the grammar FST 125 based on a comparison with the input FST. In one implementation, the determination of the "best" path(s) involves comparing every path through the input FST 120 with every path through the grammar FST 125. In other implementations, comparing each path through the input FST 120 with every path through the grammar FST 125 is not required. The "best" path(s) may correspond to all common path(s) between the input FST 120 and the grammar FST 125 or the path(s) with the lowest difference scores as computed by one or more "shortest path" algorithms, cost functions, or "lowest cost" algorithms.

In some implementations, the output FST 145 is generated by composing the input FST 120 and the grammar FST 125 to identify one or more path(s) in common or with the least amount of differences between the input FST 120 and the grammar FST 125. In some embodiments, the paths with the lowest difference scores (corresponding to the least amount of differences) are determined from the output FST 145 after it is generated. In some implementations, the paths with the lowest difference scores are determined while generating the output FST 145. The output FST 145 may be generated, or the paths with the lowest difference scores of the output FST 145 may be determined, using a beam search or other dynamic composition algorithms and methods.

In some implementations, the FST processor 135 computes a shortest edit distance (e.g., Levenshtein distance) between multiple paths of the input FST 120 and multiple paths of the grammar FST 125. A shortest edit distance (e.g., Levenshtein distance) is a metric for measuring the difference between two path sequences (e.g., the minimum number of edits to transform an item of a first path to an item of a second path). Other shortest path or lowest cost path algorithms (such as Dijkstra's algorithm, Yen's algorithm, Smith-Waterman algorithm, Viterbi algorithm, MPS algorithm, etc.) may also be used to identify the path(s) with lowest difference scores.

In some implementations, the FST processor 135 is configured to compose the input FST 120 with the grammar FST 125. Composition operations may involve matching the output labels of the transitions of one transducer with the input labels of transitions of another transducer. The result of composition is a new FST representing the relational composition of the two input FSTs.

The input FST 120 and/or the grammar FST 125 may be minimized and/or determinized prior to being compared with each other (e.g., to remove empty arcs and/or consolidate duplicate arcs). In addition, the comparison of the input FST 120 and the grammar FST 125 may involve several processing steps, involving the creation or use of additional FSTs (such as an edit FST), which is described in greater detail below in connection with FIG. 4. An edit FST may represent the edit costs, or penalties, involved with adding, removing and changing elements (e.g., words, subword units) of the input FST so that they match elements of the grammar FST 125. Creation of the edit FST may optionally be based, at least in part, on a confusion table, such as the confusion tables described elsewhere in the disclosure. In some embodiments, the edit FST determines the values of the penalties for the changes or differences identified in the comparison of the input FST 120 and the grammar FST 125. The edit FST may be pre-generated or generated in real time. The edit FST may be composed with the input FST 120 and the grammar FST 125 to generate the output FST 145, as described in more detail below in connection with FIG. 4.

The command generator 150 is configured to determine a command 155 based upon the output FST 145 and to initiate a response to the command 155 by providing the command 155 to a controllable device. In some embodiments, the output FST 145 may include multiple paths corresponding to multiple commands. The command generator 150 may determine the command 155 based on one or more criteria other than difference scores. For example, if the potential commands in the output FST are to play a song or to play a movie and the song and movie have the same title, the command generator 150 may select the command to play a song upon a determination that the user's device does not include video capability. In some embodiments, the command generator 150 may take into account user preferences specified by a user or based on previous commands or historical data associated with the user.

Figure 2C:
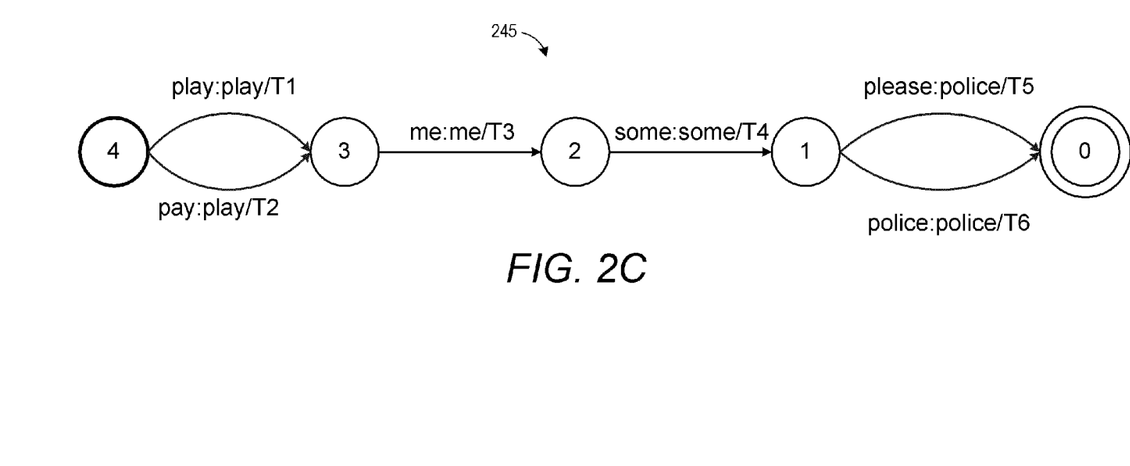
FIG. 2C is a diagram of an output finite state transducer generated by the natural language understanding unit of FIG. 1.

FIG. 2C illustrates an example of an output FST 245 generated from an input FST and a grammar FST (such as by composition of the input FST with the grammar FST). The output FST 245 is determined based on the input lattice 208 and the grammar 230 of FIGS. 2A and 2B, respectively. The word before each colon on each of the arcs is from the input lattice 208 (or the input FST generated therefrom) and the word after each colon is from the grammar 230 (or the grammar FST generated therefrom). Each of the path segments (e.g., arcs between nodes) may have a difference score associated with it. The variables after the forward slash represent difference scores at the word level (represented in FIG. 2C as T1, T2, etc.). The output FST 245 may include multiple paths, each indicative of, or having, a path difference score. For example, the output FST may include the N paths having the lowest path difference scores. In some implementations, the output FST 245 includes multiple parallel path segments between nodes. For example, as shown in FIG. 2C, there are parallel arcs between nodes 4 and 3 corresponding to two alternate path segments or portions, each having a different difference score. The parallel paths may be included if the difference scores associated with the arcs are the same or are less than a threshold value. If there is only one potential path between two nodes in common or having a difference score below a threshold value, then only one path may be generated in the output FST, such as shown between nodes 3 and 2 and nodes 2 and 1 of the output FST 245 of FIG. 2C.

As shown in FIG. 2C, each arc of the output FST 245 has a difference score. The difference scores (T1, T2, etc.) may be computed based, at least in part, on a combination of the recognition scores from the input lattice 208 (e.g., P1-P9) and the grammar scores from the grammar 230 (e.g., S1-S16). In some implementations (such as when the various scores are represented on a log scale), the difference scores may represent a sum of the values of the recognition scores and grammar scores. In other implementations, the recognition scores and grammar scores are associated with a multiple or weighting factor based on one or more criteria and combined in any desired manner to generate the difference scores. In yet other implementations, the difference scores may be independent of the recognition scores and grammar scores.

In some implementations, difference scores may be generated on the word level. If the word from the input lattice (the word before the colon on the arc) and the word from the grammar (the word after the colon on the arc) are the same, then there is no penalty added in determining the difference score. If the word from the input lattice and the word from the grammar are different, a penalty may be added in determining the difference score. With reference to FIG. 2C, the difference score T1 may have a lower difference score value than T2 because T2 would include a penalty for a substitution of "pay" with "play."

In order to improve the accuracy of the comparison between the input FST 120 and the grammar FST 125, the paths of the respective FSTs may be compared at the phoneme level instead of at the word level. For example, a comparison of "pay" and "play" may have a low difference score since the words are acoustically similar (e.g., have multiple phonemes in common), but a comparison of "zebra" and "play" may have a higher difference score since the words are acoustically very different (e.g., do not have phonemes in common). Accordingly, at least some of the portions of the input FST 120 and/or the grammar FST and the grammar FST 125 can be converted such that the arcs representing words are divided into subword units (e.g., phonemes) and compared on the subword level instead of the word level.

In some implementations, the entire input FST 120 and the entire grammar FST 125 may be converted to (or generated as) FSTs of subword units (e.g., phoneme FSTs). In other implementations, a subset of paths identified as more likely paths (e.g., N-best paths) based on a comparison of the word FSTs may be broken down into FSTs comprising subword units to improve accuracy and reduce language understanding errors due to a word comparison alone. In some implementations, arcs of word FSTs may be converted to a sequence of arcs for the corresponding subword units "on the fly" (e.g., substantially immediately or substantially in real time) as desired. The words may be converted to subword units by consulting a lexicon, for example. In some implementations, the lexicon stores a sequence of subword units (e.g., phonemes or pronunciation units) for a large number of words in a database. The lexicon may be stored in memory in local memory or a global data store communicatively coupled to the natural language understanding unit 110. It should be noted that each of the words in FIGS. 2A-2C can be represented on the subword unit level in some implementations.

Figure 2D:
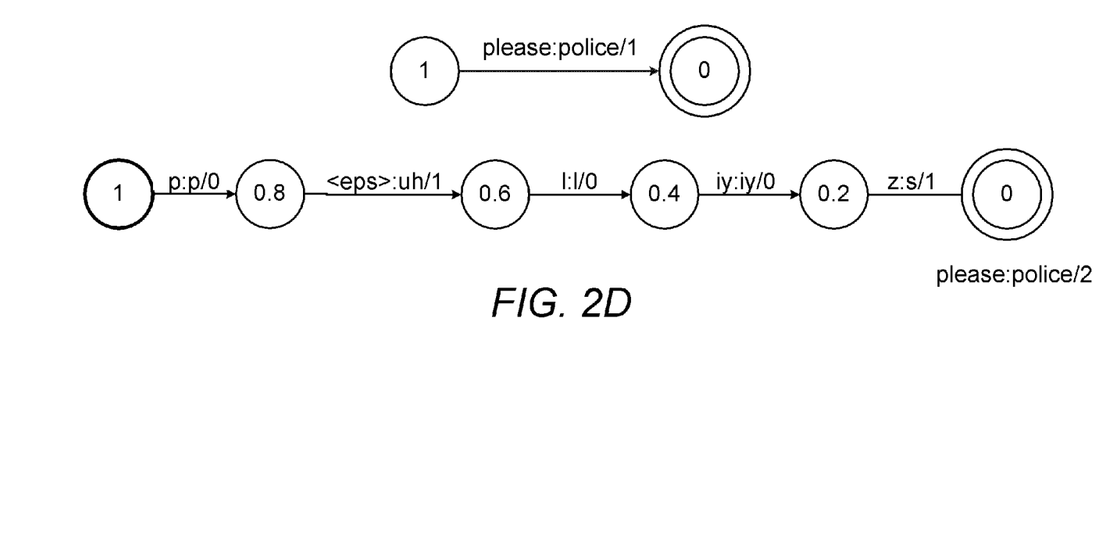
FIG. 2D is a diagram of a finite state transducer of phonemes generated from an arc of a finite state transducer of a word.

FIG. 2D illustrates the transition between nodes 1 and 0 of the output FST 245 of FIG. 2C. The first FST illustrates a comparison on the word level and the second FST illustrates the comparison on the phoneme level. The comparison on the word level involves a substitution of the word "please" with the word "police." For illustration purposes, this substitution has been represented as having a penalty of 1; however, other penalties may be used.

The second FST shown in FIG. 2D illustrates an example of how performing a comparison at the phoneme level may result in more precise calculations than comparisons performed at the word level, which may in turn result in fewer speech processing errors. The second FST divides the arc corresponding to the "please/police" word comparison between nodes 1 and 0 into multiple sub-arcs between sub-nodes 1, 0.8, 0.6, 0.4, 0.2 and 0) based on phoneme comparisons. Instead of a single penalty for the substitution of the word "please" with the word "police," a comparison at the phoneme level allows for penalties to be provided for insertions, deletions and substitutions between phonemes of the two words.

For simplicity, transitions between arcs involving no edits or changes (e.g., no substitutions, insertions, or substitutions) have been represented as having penalties of 0 and all edits or changes have been represented as having a penalty of 1; however, in some implementations, even transitions involving no edits or changes will have non-zero difference scores. As shown, by comparing the edits on a phoneme level, the overall difference score for the word is based on a combination of two penalties (resulting from one insertion and one substitution) for an overall difference score of 2. Difference scores between two words at the word level may be small or the same, while difference scores at the phoneme level may be higher due to significant differences in phonemes between the words. Accordingly, comparison at the phoneme level may improve accuracy in natural language understanding processing due to the more detailed analysis and increased precision in comparisons.

The penalties may vary by edit type. In some embodiments, the penalties (e.g., edit costs) may be fixed, or static, for each edit type. For example, insertions may be assigned a first penalty, deletions may be assigned a second penalty and substitutions may be assigned a third penalty, where each of the first penalty, second penalty and third penalty represent fixed values. In some implementations, the penalties are the same regardless of edit type (e.g., all edits have a penalty of 1). In other implementations, the penalties may be determined by applying a confusion table, such that the penalties are variable and not fixed, as will be described in more detail below in connection with FIG. 3A.

Referring back to FIG. 1, the confusion table 140 may optionally be applied to determine penalties for substitutions, insertions and/or deletions. In some implementations, the confusion table 140 is used by the FST processor 135 to determine difference scores between the input FST 120 and the grammar FST 125. In some implementations, the confusion table 140 may be applied to the grammar 130 or to the grammar FST 125. The confusion table 140 may include penalties for confusing each phoneme in a list of possible phonemes with each other phoneme in the list of possible phonemes.

The confusion table 140 may include penalties (or alternatively, costs, probabilities, likelihoods or scores) for phoneme substitutions, insertions and/or deletions. In some implementations, the confusion matrix 140 includes separate lists or tables for the penalties of substitutions, insertions and deletions. In other implementations, the penalties of substitutions, insertions and deletions are included in a single extended confusion table. The penalties related to substitutions in the confusion table 140 may take into account phonetic similarity. For example, phonemes with greater phonetic similarity may have higher confusion probabilities than phonemes with lesser phonetic similarity, as discussed above. In some implementations, the penalties may be determined experimentally. In various implementations, the confusion table 140 may include context dependent penalties. For example, the penalties in the confusion table may correspond to and/or be selected based upon surrounding, neighboring and/or adjacent phonemes (e.g., to the left and/or to the right, etc.). The penalties for substitution, insertion and deletion may be context-dependent, with different penalties being identified in the confusion table based upon the particular phoneme's context (e.g., neighboring or adjacent phonemes, etc.).

Figure 3A:
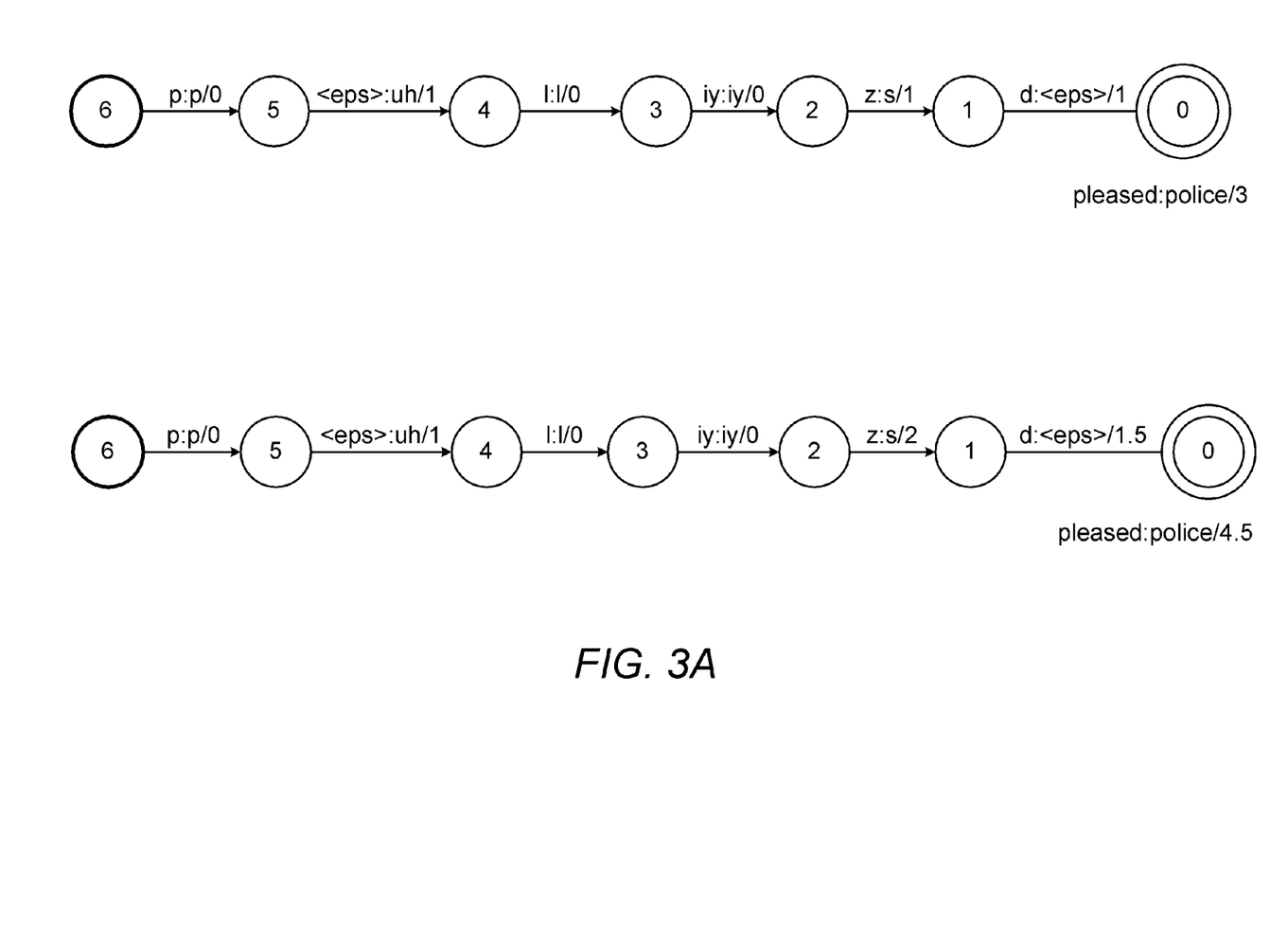
FIG. 3A illustrates two phoneme diagrams and an example result of phoneme level comparison using a phoneme confusion table.

Turning to FIG. 3A, a phoneme confusion table may facilitate a more accurate computation of difference scores between paths of the input FST and the paths of the grammar FST. FIG. 3A illustrates two phoneme diagrams for FSTs that correspond to the comparison of the word "pleased" with the word "police, without and with use of a phoneme confusion table, respectively. As shown in the first phoneme diagram, in some implementations, the penalties for all edits or changes (e.g., substitutions, insertions, deletions) may be the same (e.g., have a fixed value of 1). The first phoneme diagram shows a penalty of 1 for the insertion between nodes 5 and 4, for the substitution of "z" with "s" between nodes 2 and 1, and for the deletion between nodes 1 and 0, for a total difference score of 3. In other implementations, the penalties may be fixed but may vary depending on the edit type. For example, insertions may have a lower fixed penalty than substitutions and deletions and substitutions may have a higher or lower fixed penalty than substitutions.

In some implementations, a phoneme confusion table may be applied so that the penalties vary depending on the type of edit and/or the likelihood of confusion. For example, as shown in the second phoneme diagram, a penalty of 1 is assigned for the insertion between nodes 5 and 4, a penalty of 2 is assigned for the substitution of "z" with "s," between nodes 2 and 1, and a penalty of 1.5 is assigned for the deletion between nodes 1 and 0, for a total difference score of 4.5. By applying a confusion table in identifying difference scores, a more accurate difference score may be determined. For example, without a confusion table, a small difference (e.g., substituting "s" for "f") may have the same score as a large difference (e.g., substituting a consonant for a vowel), but with a phoneme confusion table the difference scores may correspond to the degree of difference. In some implementations, insertions and/or deletions of phonemes may have higher penalties than substitutions of phonemes. In some implementations, the penalties may depend on context. For example, the penalties may be different even for the same phoneme edits based on the phonemes to the left and/or right of the phoneme being inserted, deleted or substituted.

Figure 3B:
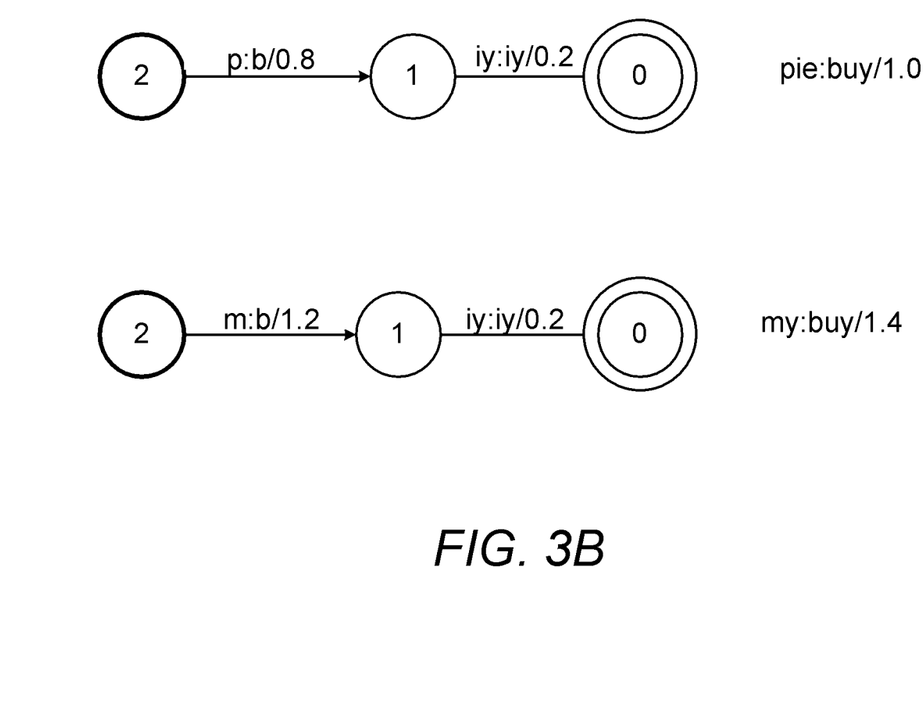
FIG. 3B illustrates two phoneme diagrams and an example result of varying costs for phoneme substitutions based on phonetic similarity.

FIG. 3B illustrates the effect of using a phoneme confusion table. Using a phoneme confusion table may result in more accurate overall difference scores, thereby reducing errors in language understanding. As shown, the substitution of the phoneme "p" with the phoneme "b" is given a penalty of 0.8 while the substitution of the phoneme "m" with the phoneme "b" is given a penalty of 1.2. The substitution of "p" with "b" is given a lower penalty than the substitution of "p" with "m" because "p" and "b" have a greater degree of phonetic similarity than "b" and "m." In some implementations, the penalties may depend on context. For example, the penalties may be different even for the same phoneme substitutions based on the phonemes to the left and/or right of the phoneme being substituted. Penalties based on phonetic similarity may reduce errors that may arise if all phoneme substitutions have static (e.g., the same) penalties. A confusion table (e.g., confusion matrix) may be used to identify the penalties based on phonetic similarity. The phoneme diagrams shown in FIG. 3B illustrate that even arcs involving no edits or changes (e.g., no penalties) may have non-zero difference scores.

Referring back to FIG. 2C, the overall difference scores for each path in the output FST 245 may be computed by summing up the difference scores of each of the arcs along the path. In some implementations, computing the overall difference scores for each path may involve weighting or other factors and may involve other operations other than summing alone.

Speech Processing Method for Error Reduction

Figure 4:
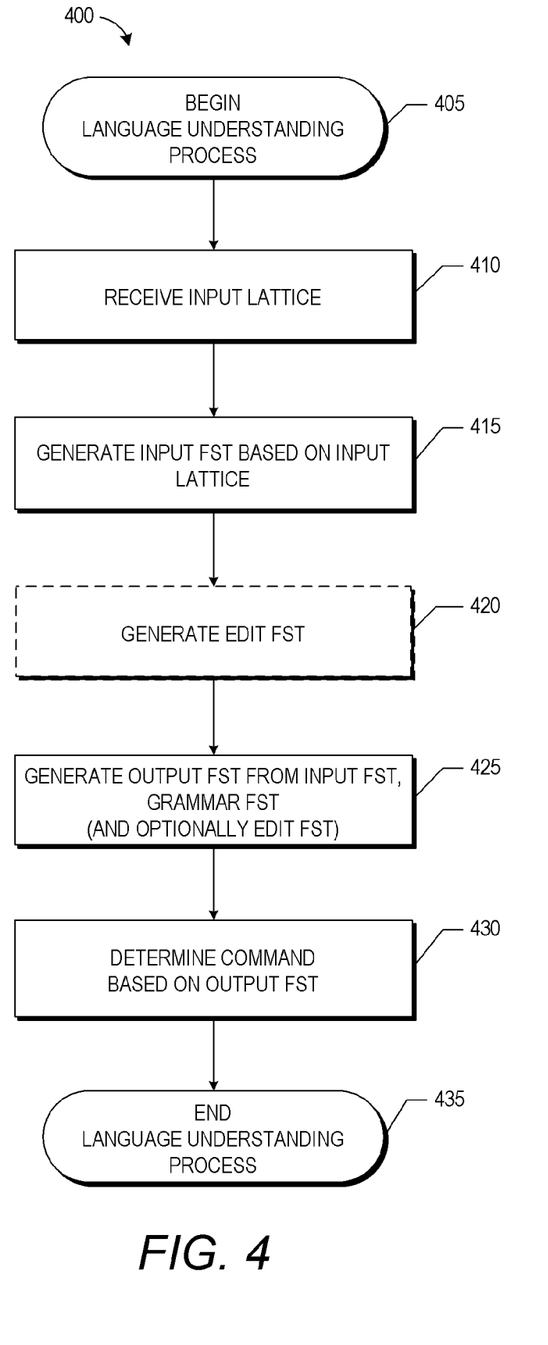
FIG. 4 is a flow diagram of an illustrative process for reducing errors in speech processing performed by the natural language understanding unit of FIG. 1.

FIG. 4 illustrates a flow diagram of an illustrative process 400 for reducing errors in language understanding performed by the natural language understanding unit of FIG. 1. A computing device 500, as described below with respect to FIG. 5, may be configured to execute the process 400. In some embodiments, the process 400 may be executed by one or more processors of the natural language understanding unit 110 of FIG. 1.

The process 400 begins at block 405. The process 400 may be executed upon receipt of speech output from an automatic speech recognition unit, such as automatic speech recognition unit 105 of FIG. 1. Although the illustrative process 400 will be described with reference to lattices and finite state transducers, other graphs or data structures may be used instead in various embodiments.

At block 410, an input lattice is received as output from the automatic speech recognition unit 105. As described above, the input lattice can represent possible utterances (such as sentences or word sequences) spoken by a user. In some embodiments, the input lattice includes recognition scores (e.g., probabilities, costs, likelihoods, weights) associated with each word in the input lattice. In some embodiments, the input lattice may comprise phonemes or other subword units in addition to or instead of words. The output from the automatic speech recognition unit 105 may be a data structure other than a lattice in other implementations, such as a list, table or graph.

At block 415, an input FST is generated corresponding to the input lattice. In some embodiments, the input FST is generated by the lattice processor 115. In some embodiments, the input FST may contain the same information as the input lattice but expressed in a different format. In some embodiments, the lattice processor 115 may modify the information. For example, words in the input lattice may be converted into sequences of subword units and the input lattice may contain the sequences of subword units in addition to or instead of the corresponding word. In some cases, the input FST may be minimized and determinized at block 415.

The grammar FST may be pre-generated and accessed from storage or memory or may be generated in real time at block 415. In some embodiments, the arcs of the grammar FST correspond to words. In some embodiments, one or more of the arcs of the grammar FST correspond to subword units (e.g., phonemes). The arcs of the grammar FST may also be associated with a grammar score (e.g., probability, likelihood, etc.).

In some implementations, an "edit" FST is optionally generated or created at block 420 based on the input FST and the grammar FST. The edit FST may represent the edit costs, or penalties, associated with adding, removing and changing elements (e.g., words, subword units) of the input FST so that they match elements (e.g., subword units) of the grammar FST. Creation of the edit FST may optionally be based at least in part on a confusion table, such as the confusion tables described elsewhere in the disclosure. In some embodiments, the edit FST determines the values of the penalties of the confusion table for the changes or differences identified in the comparison of the input FST and the grammar FST. In some embodiments, the edit FST is generated in advance from a confusion table and is not required to be performed in the process 400.

At block 425, an output FST indicative of differences between paths of the input FST and paths of the grammar FST is generated by comparing the paths of the input FST with paths of the grammar FST. In some implementations, difference scores are computed for the paths of the output FST or a subset of the output FST paths. The difference scores may be determined based at least in part by a combination of the grammar scores of the grammar FST and the recognition scores of the input FST, as described above. In implementations where the arcs of the input FST and/or the grammar FST comprise words, the FST processor 135 may look up each word in a lexicon file to find the sequence of phonemes associated with each word and replace the arcs labeled with words with a set of arcs labeled with constituent phonemes. The input FST and/or the grammar FST may then be minimized and determinized after replacement with the phonemes. Empty arcs may also be removed.

In some implementations, the optional edit FST created at block 420 from the confusion table is composed with the input FST and the grammar FST to generate the output FST. A difference score (e.g., distance score or cost function) may be computed in generating the output FST from the composition of the input FST, the edit FST and the grammar FST for each of the paths in the output FST. The difference scores for each of the paths may be calculated based on the edit costs, or penalties, in the edit FST, the recognition scores of the input FST and/or the grammar scores of the grammar FST. The output FST of block 425 (and of the FST processor 135 of FIG. 1) may be the result of the composition of the grammar FST, the edit FST and the input FST. In some implementations, the output FST is indicative of one or more common paths between the input FST and the grammar FST with the lowest difference scores (e.g., distance scores determined by a shortest edit distance calculation). In some implementations, the output FST is indicative of the N-shortest distance paths (e.g., such as determined by performing a shortest path operation). In other implementations, the output FST is indicative of all common paths between the input FST and the grammar FST.

After the output FST is generated at block 425, the process 400 generates or determines a command based on the output FST at block 430. The command may be determined for example by the command generator 150 of the natural understanding unit 110. As discussed above, the output FST may include multiple paths corresponding to different commands. Commands may include, for example, commands or queries related to media, purchasing, web searching, weather, or time applications. If there are multiple paths to choose from, the process 400 determines a final output path (and a corresponding command) based on one or more criteria. In some implementations, the final output path is determined as the path with the lowest difference score or the shortest edit distance. In some implementations, the final output path is determined based on historical user data or preferences, availability of hardware or files, etc.

In some implementations, the process 400 initiates an action based on the command. For example, the command may trigger a function call based on the command. The function call may, for example, trigger playing a particular song requested by the user, dictating the current time, or initiating a purchase order. Determining the command and/or initiating an action may require assignment of variables or consideration of annotations associated with the final output path. In some implementations, the actions in response to the command or query may be initiated on a computing or other electronic device communicatively coupled to the speech processing system 100. The process ends at block 435.

Execution Environment

Figure 5:
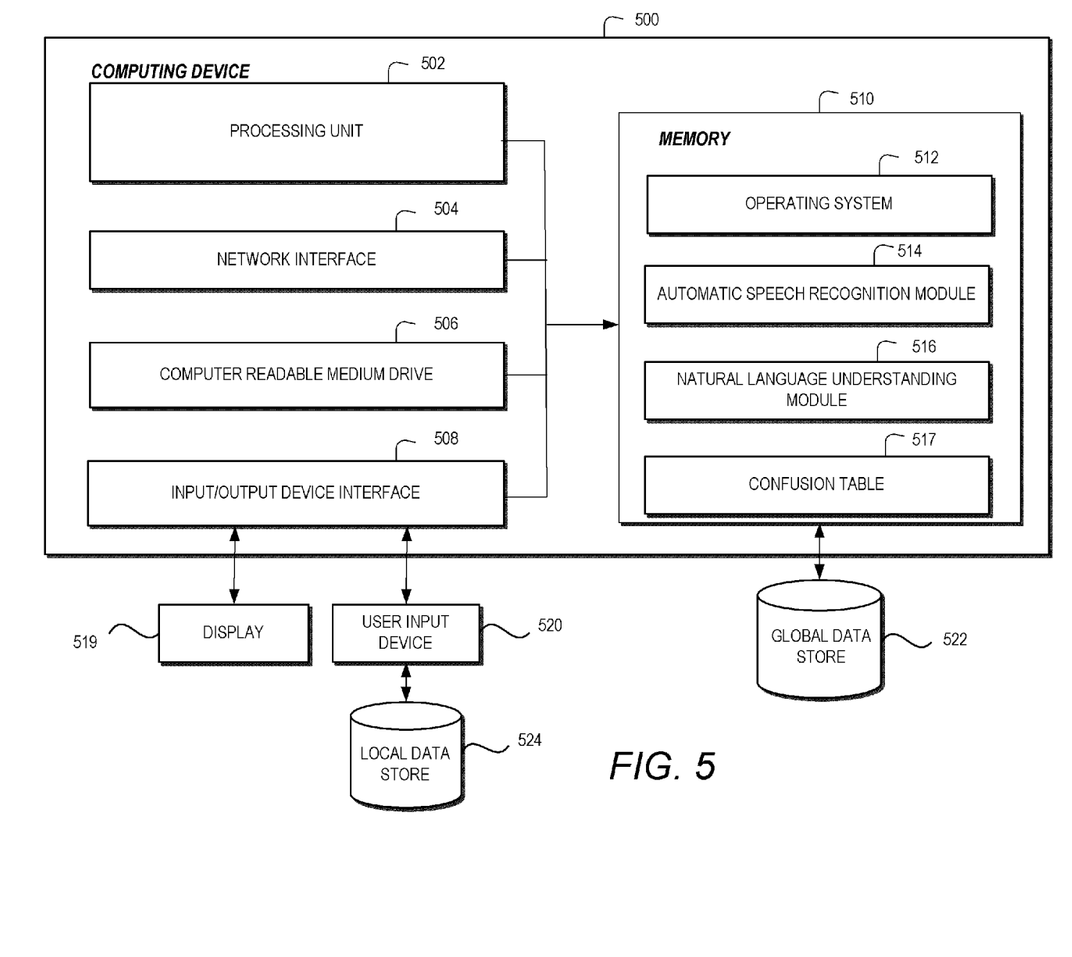
FIG. 5 is a block diagram of an illustrative computing device configured to execute some or all of the processes and embodiments described herein.

FIG. 5 illustrates one embodiment of a computing device 500 configured to execute the processes and implement the features described above. The computing device 500 can be a server or other computing device, and can comprise a processing unit 502, a network interface 504, a computer readable medium drive 506, an input/output device interface 508 and a memory 510. The network interface 504 can provide connectivity to one or more networks or computing systems. The processing unit 504 can receive information and instructions from other computing systems or services via the network interface 504. The network interface 504 can also store data directly to memory 510. The processing unit 502 can communicate to and from memory 510 and output information to an optional display 519 via the input/output device interface 508. The input/output device interface 508 can also accept input from the optional user input device 520, such as a keyboard, mouse, digital pen, microphone, etc. In some embodiments, the user input device 520 is communicatively coupled to the computing device 500 over a network. The user input devices 520 may also include or communicate with one or more auxiliary data stores, such as local data store 524.

The memory 510 contains computer program instructions that the processing unit 502 executes in order to implement one or more embodiments. The memory 510 generally includes RAM, ROM and/or other persistent, non-transitory computer-readable media. The memory 510 can store an operating system 512 that provides computer program instructions for use by the processing unit 502 in the general administration and operation of the computing device 500. The memory 510 can further include computer program instructions and other information for implementing aspects of the present disclosure. For example, in one embodiment, the memory 510 includes an automatic speech recognition module 514 that can be executed by the processing unit 502. In some implementations, the automatic speech recognition module 514 accepts input in the form of utterances and generates recognition hypotheses based on such utterances. The recognition hypotheses may be stored in the memory 510 or in a global data store 522 in data structures such as lists, lattices, or directed graphs. The memory 510 can also include a natural language understanding module 516 that can be executed by the processing unit 502. The natural language understanding module 516 can include the components (e.g., modules) of the natural language unit 110 of FIG. 1, such as the lattice processor 115, the FST processor 135 and/or the command generator 150. In some implementations, memory 510 includes a confusion table 517 configured to be used or accessed by the natural language understanding module 516. Memory 510 may also include or communicate with one or more auxiliary data stores, such as global data store 522. In some implementations, the confusion table 517 is stored on the global data store 522. Global data store 522 may electronically store data regarding grammars, lexicons and the like. In some implementations, data regarding grammars, lexicons and the like may be stored, at least temporarily, in the memory 510.

In operation, the computing device 500 loads the natural language understanding module 516 from the computer readable medium drive 506 or some other non-volatile storage unit into memory 510. Based on the instructions of the natural language understanding module 516 (e.g., natural language understanding unit 110), the processing unit 502 can load data from the data store 522 into memory 510, perform calculations on the loaded data or on data input from the user input device 520 and initiate actions to generate responses to be sent to the optional user input device 520.

In some embodiments, the computing device 500 may include additional or fewer components than are shown in FIG. 5. For example, a computing device 500 may include more than one processing unit 502 and computer readable medium drive 506. In another example, the computing device 502 may not include be coupled to a display 519 or a user input device 520. In some embodiments, two or more computing devices 500 may together form a computer system for executing features of the present disclosure. For example, the computing device 500 may comprise multiple distributed computing resources connected over a network. In some implementations, the computing device 500 comprises one or more servers.

Terminology

Depending on the embodiment, certain acts, events, or functions of any of the processes or algorithms described herein can be performed in a different sequence, can be added, merged, or left out all together (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines and algorithm steps described in connection with the embodiments disclosed herein can be implemented as electronic hardware, computer software, or combinations of both. To clearly illustrate this interchangeability of hardware and software, various illustrative components, blocks, modules and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The steps of a method, process, routine, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some, or all of the elements in the list.

Conjunctive language such as the phrase "at least one of X, Y and Z," unless specifically stated otherwise, is to be understood with the context as used in general to convey that an item, term, etc. may be either X, Y, or Z, or a combination thereof. Thus, such conjunctive language is not generally intended to imply that certain embodiments require at least one of X, at least one of Y and at least one of Z to each be present.

While the above detailed description has shown, described and pointed out novel features as applied to various embodiments, it can be understood that various omissions, substitutions and changes in the form and details of the devices or algorithms illustrated can be made without departing from the spirit of the disclosure. As can be recognized, certain embodiments of the inventions described herein can be embodied within a form that does not provide all of the features and benefits set forth herein, as some features can be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A system for reducing errors in speech processing, comprising:

an automatic speech recognition module configured to:
  receive an utterance; and
  generate an input word lattice based on the utterance;
an electronic data store in communication with the automatic speech recognition module, the electronic data store configured to store the input word lattice, a grammar and a phoneme confusion table, wherein the input word lattice comprises a plurality of speech recognition hypotheses, the grammar comprises a plurality of commands and the phoneme confusion table comprises a plurality of insertion, deletion and substitution probabilities; and
a natural language understanding module in communication with the electronic data store, the natural language understanding module configured to:
  generate an input finite state transducer (FST) based at least in part on the input word lattice,
    wherein the input FST comprises sequences of phonemes organized into input FST paths, and
    wherein a path of the input FST paths corresponds with a speech recognition hypothesis of the speech recognition hypotheses;
  generate an edit FST based at least in part on the phoneme confusion table;
  generate a grammar FST based at least in part on the grammar,
    wherein the grammar FST comprises sequences of phonemes organized into grammar FST paths, and wherein a path of the grammar FST paths corresponds to a command of the plurality of commands;
generate an output FST using the input FST, the edit FST and the grammar FST,
wherein a path of the output FST corresponds to a command of the plurality of commands, and
wherein a first path of the output FST is indicative of a difference between a first path of the input FST paths and a first path of the grammar FST paths;
compute a first difference score using the first path of the output FST;
determine a command representative of the received utterance based at least in part on the first difference score; and
initiate an action based at least in part on the determined command.

2. The system of claim 1, wherein the first difference score is smaller than a difference score for any other pair of paths from the grammar FST and the input FST.

3. The system of claim 1, wherein the output FST comprises a second path indicative of a difference between a second path of the input FST and a second path of the grammar FST.

4. The system of claim 1, wherein the natural language understanding module is further configured to select a path from the output FST and wherein the selected path comprises information about the action.

5. The system of claim 1, wherein the natural language understanding module is further configured to generate the output FST by performing a composition operation using the grammar FST, the edit FST and the input FST.

6. A computer-implemented method, comprising:
under control of one or more computing devices configured with specific computer-executable instructions,
receiving an utterance;
generating an input finite state transducer (FST) comprising sequences of subword units organized into input FST paths, wherein a path of the input FST paths corresponds to a speech recognition hypothesis of a plurality of speech recognition hypotheses that are based on the received utterance;
obtaining a grammar of utterances, wherein each utterance of the grammar of utterances comprises a sequence of subword units;
generating, using the grammar of utterances, an utterance FST comprising sequences of subword units organized into utterance FST paths, wherein a path of the utterance FST paths corresponds to a command;
generating an output FST using the input FST and the utterance FST, wherein the output FST comprises a first path indicative of a difference between a first path of the input FST paths and a first path of the utterance FST paths, and a second path indicative of a difference between the first path of the input FST paths and a second path of the utterance FST paths;
computing a first difference score using the first path of the output FST;
computing a second difference score using the second path of the output FST; and
determining a first command representative of the received utterance based at least in part on the first difference score and the second difference score.

7. The method of claim 6, wherein the output FST comprises a second path indicative of a difference between a second path of the input FST and a second path of the utterance FST.

8. The method of claim 7, further comprising computing a second difference score using the second path of the output FST.

9. The method of claim 8, further comprising selecting a path from the output FST based at least in part on the first difference score and the second difference score.

10. The method of claim 6, wherein the input FST was generated from one of a lattice of speech recognition results or an N-best list of speech recognition results.

11. The method of claim 6, wherein said subword units comprise phonemes.

12. The method of claim 6, wherein said computing a first difference score using the first path of the output FST comprises computing a Levenshtein distance.

13. The method of claim 6, wherein said generating an output FST using the input FST and the utterance FST further comprises generating an edit FST based at least in part on a subword unit confusion table.

14. The method of claim 13, wherein the subword unit confusion table comprises a plurality of insertion, deletion and substitution probabilities.

15. The method of claim 14, wherein the difference score is based on the probabilities in the subword unit confusion table.

16. The method of claim 15, wherein the difference score corresponding to substitution of a first subword unit with a second subword unit having a high confusion probability with the first subword unit is lower than the difference score corresponding to substitution of a third subword unit having a low confusion probability with the first subword unit.

17. The method of claim 14, wherein the probabilities are context-dependent based at least in part on neighboring phonemes.

18. The method of claim 13, wherein said generating an output FST comprises performing a composition operation using the utterance FST, the edit FST and the input FST.

19. The method of claim 6, further comprising initiating an action based at least in part on the determined command representative of the received utterance.

20. The method of claim 6, further comprising generating the plurality of speech recognition hypotheses by performing automatic speech recognition on the utterance.

21. The method of claim 6, wherein:
determining the first command representative of the received utterance is further based on a capability of the one or more computing devices; and
the method further comprises performing, with the one or more computing devices, an action based on the first command.

22. The method of claim 6, wherein:
the first path of the output FST comprises a plurality of nodes and one or more arcs between nodes of the plurality of nodes;
an arc of the one or more arcs is associated with a subword included in the first path of the input FST, a subword included in the first path of the utterance FST, and a difference score; and
the difference score of the arc is based on a difference between the subword included the first path of the input FST and the subword included in the first path of the utterance FST.

23. The method of claim 22, wherein the first difference score is based on one or more difference scores associated with the one or more arcs of the first path of the output FST.

24. The method of claim 6, wherein the determining the first command is further based at least in part on at least one of: historical user data, a user preference, availability of hardware, availability of a file, or a capability of a computing device to process the first command.

25. A non-transitory computer-readable medium comprising one or more modules configured to execute in one or more processors of a computing device, the one or more modules being further configured to:
    receive an utterance;
    generate a plurality of speech recognition hypotheses based on the received utterance, wherein each hypothesis of the plurality of speech recognition hypotheses comprises a sequence of subword units;
    obtain a grammar of utterances, wherein each utterance of the plurality of utterances comprises a sequence of subword units;
    generate an input finite state transducer (FST) from the plurality of hypotheses;
    generate a grammar FST from the grammar of utterances, wherein the grammar FST comprises a plurality of paths of subword units, and
    wherein a path of the grammar FST corresponds to a command;
    generate an output FST using the input FST and the grammar FST, wherein the output FST comprises:
    a first path indicative of a difference between a first path of the input FST and a first path of the grammar FST; and
    a second path indicative of a difference between a second path of the input FST and a second path of the grammar FST;
    compute a first difference score using the first path of the output FST;
    compute a second difference score using the second path of the output FST; and
    determine a command representative of the received utterance based at least in part on the first difference score and the second difference score.

26. The non-transitory computer readable medium of claim 25, wherein said utterances comprise commands or queries.

27. The non-transitory computer readable medium of claim 25, wherein said computing the first difference score and said computing the second difference score further comprises generating an edit FST that assigns penalties associated with insertions, deletions and substitutions of subword units between the input FST and the grammar FST.

28. The non-transitory computer readable medium of claim 27, wherein said edit FST is composed with the input FST and the grammar FST by performing a composition operation to generate an output FST.

29. The non-transitory computer readable medium of claim 27, wherein substitution penalties are based on phonetic similarity between subword units.

30. The non-transitory computer readable medium of claim 25, wherein said first difference score and said second difference score are performed by computing a Levenshtein distance.

* * * * *